US008075990B2

(12) United States Patent
Prick

(10) Patent No.: US 8,075,990 B2

(45) Date of Patent: Dec. 13, 2011

(54) BUILDING MATERIAL AS WELL AS A METHOD FOR MANUFACTURING THE SAME AND USE OF THE BUILDING MATERIAL

(75) Inventor: Raoul Guilielmus Boudewijn Marie Prick, Maastricht (NL)

(73) Assignee: Modina B.V. (NL)

( * ) Notice: Subject to any disclaimer, the term of this patent is extended or adjusted under 35 U.S.C. 154(b) by 445 days.

(21) Appl. No.: 12/309,557

(22) PCT Filed: Jul. 20, 2007

(86) PCT No.: PCT/NL2007/000186

§ 371 (c)(1), (2), (4) Date: Apr. 28, 2009

(87) PCT Pub. No.: WO2008/010706

PCT Pub. Date: Jan. 24, 2008

(65) Prior Publication Data

US 2010/0009167 A1 Jan. 14, 2010

(30) Foreign Application Priority Data

Jul. 21, 2006 (NL) ..................................... 1032221

(51) Int. Cl.

| | |
|---|---|
| ***B32B 3/26*** | (2006.01) |
| ***B32B 5/16*** | (2006.01) |
| ***B29C 71/00*** | (2006.01) |
| ***B29C 67/00*** | (2006.01) |

(52) U.S. Cl. ..................... 428/317.1; 428/323; 428/340; 428/326; 428/327; 428/331; 428/317.7; 428/317.9; 428/318.4; 428/319.1; 428/325; 264/493; 264/462; 264/460; 264/487

(58) Field of Classification Search .................. 428/323, 428/325, 326, 327, 331, 317.1, 317.7, 317.9, 428/318.4, 319.1, 340; 264/493, 462, 460, 264/487

See application file for complete search history.

(56) References Cited

U.S. PATENT DOCUMENTS 6,214,438 B1 4/2001 Prick

FOREIGN PATENT DOCUMENTS

| | | |
|---|---|---|
| NL | 1005149 | 3/1998 |
| WO | WO 90/11419 | 4/1990 |

OTHER PUBLICATIONS

PCT Written Opinion for corresponding application PCT/NL2007/000186, Dec. 2007.

International Search Report for corresponding application PCT/NL2007/000186 with a mailing date of Dec. 12, 2007.

*Primary Examiner* — Ling Xu

(74) *Attorney, Agent, or Firm* — Woods, Phillips, Katz, Clark & Mortimer

(57) ABSTRACT

The present invention relates to a building material consisting of a moulded product of a base material, which moulded product is provided with at least one cavity, which cavity is filled with a filler in the form of loose particles, which loose particles have been bonded together by means of a binding agent, wherein the binding agent is present on the loose filler particles in the form of droplets. The present invention furthermore relates to a method for manufacturing such a building material In addition to that the present invention relates to a use of the present building material.

58 Claims, 1 Drawing Sheet

BUILDING MATERIAL AS WELL AS A METHOD FOR MANUFACTURING THE SAME AND USE OF THE BUILDING MATERIAL

TECHNICAL FIELD

The present invention relates to a building material consisting of a moulded product of a base material, which moulded product is provided with at least one cavity, which cavity is filled with a filler in the form of loose particles, which loose particles have been bonded together by means of a binding agent. The present invention also relates to a method for manufacturing a building material, which method comprises the steps of: providing a moulded product of a base material, which moulded product is provided with at least one cavity; providing a filler in the form of loose particles; applying a binding agent to the loose filler particles; introducing the loose filler particles into said at least one cavity of the moulded product; and curing the binding agent so as to obtain a building material in which the loose filler particles are bound together by the binding agent. In addition to that the present invention relates to a use of the present building material or to a building material obtained by using the present method.

BACKGROUND

Such a building material and a method for manufacturing the same is known from Dutch patent No. 1005149 to the present inventor. Said patent describes an insulation board comprising a basic cellular sheet material and an insulation material consisting of loose fibres, with which the cells are filled. Such insulation board has relative small openings. The fibres of the insulation material are completely moisturised with a solution of binding agent and subsequently a large number of small openings of the insulation board are filled therewith, after which curing of the binding agent takes place.

Building blocks comprising larger cavities, especially cavities which extend the entire height of the insulation board, that is, cavities in the form of channels, cannot be manufactured by means of such a known method, however. If such a known method were to be used, the insulation material would fall out of the cavities even before the binding agent has sufficiently cured, which is undesirable.

Such moulded products comprising large cavities or channels are currently manufactured by shaping a filler to the form of the cavity or the channel in advance, for example by using a cured foam as a filler, which cured foam is brought to size in advance, after which the shaped foam is introduced into the cavity or the channel. Such a method is very labour-intensive and time-consuming. In addition, it is practically impossible to fill the cavities in their entirety by means of said method.

SUMMARY OF THE INVENTION

Accordingly it is an object of the present invention to provide a method for manufacturing a building material, which method is suitable for use with building materials provided with one or more cavities, in particular cavities (or channels) which extend the entire height of the building material, whilst the filler is firmly anchored in the building material.

Another object of the present invention is to provide a method by means of which cavities in a moulded product can be filled in a quick and simple manner with a filler consisting of loose particles, without the risk of the filler material falling out of the final building material during storage, transport or handling thereof.

An additional object is to provide a building material whose cavity (cavities) is (are) completely filled with filler material.

Furthermore it is an object of the present invention to provide a method for providing an insulation material between columns and walls of a building.

One or more of the above objects are accomplished by a material according to the preamble, which is characterised in that the binding agent is present on the loose filler particles in the form of droplets having a size ranging between about 1 μm and about 50 μm.

BRIEF DESCRIPTION OF THE DRAWING

The present invention will now be explained by means of a description of a number of preferred embodiments and examples. The invention will also be explained by means of the drawing, in which.

DETAILED DESCRIPTION OF THE DRAWING

Figure 1:
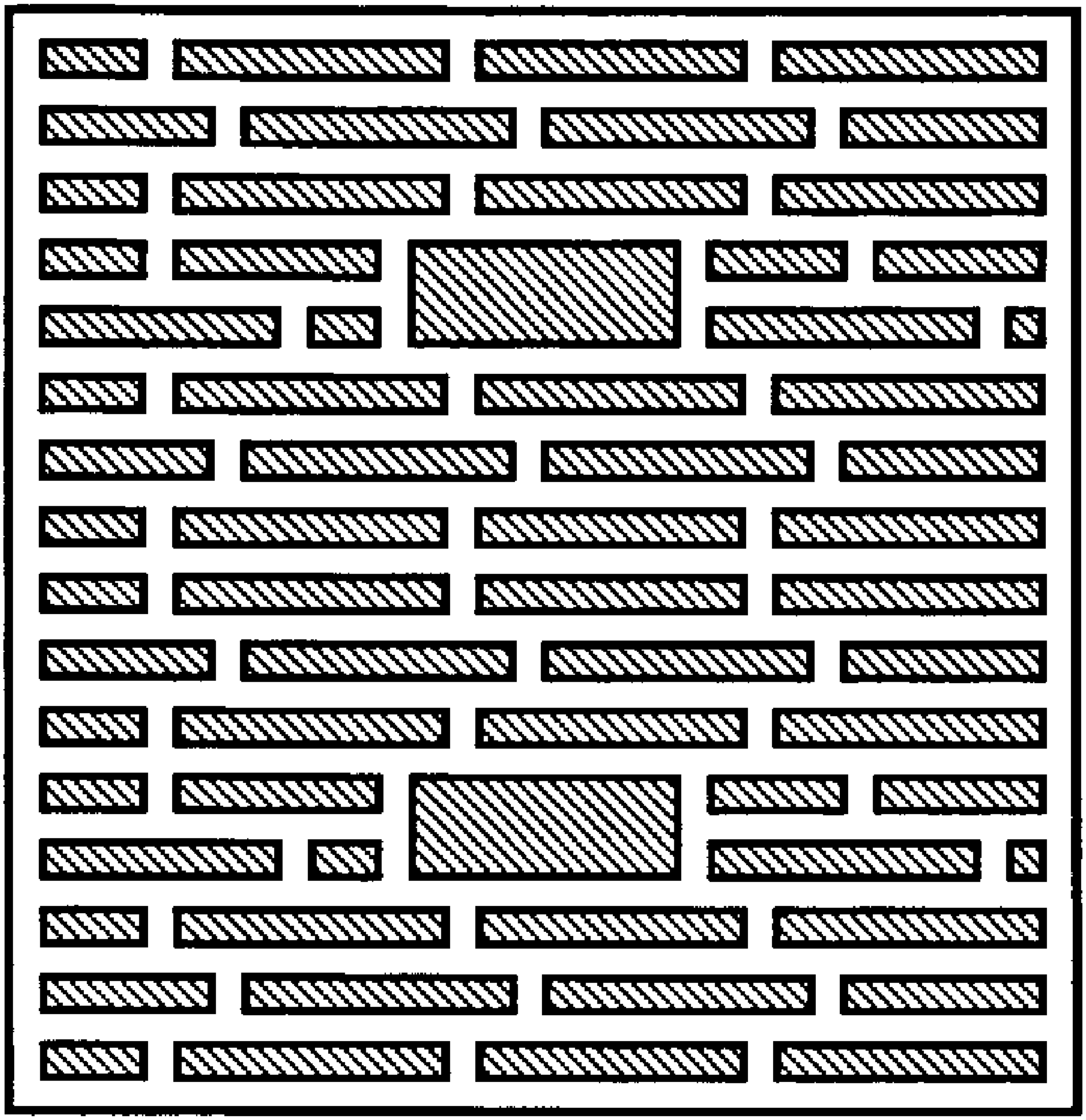
FIG. 1 is a schematic top plan view of a building material according to the present invention, in which the shaded parts indicate the cavities of the moulded product, which are filled with filler material.

During research carried out by the present inventors, the following was surprisingly found. In the method according to the prior art the loose filler particles are completely moisturised with binding agent. If the binding agent is applied to the loose filler particles in the form of discrete droplets rather than as a uniform film, however, excellent results are obtained as regards the rate and the extent of curing of the binding agent and also as regards the adhesion of the loose filler particles to each other and the adhesion of the loose filler particles to the inner wall of said at least one cavity.

It has been found that an adhesive network of the loose filler particles, bonded together by the droplets of binding agent, is obtained when small droplets of binding agent are used. Such a network has a good bonding power, flexibility, density and stability. It has furthermore been found that the present small droplets of binding agent cure more rapidly than in the situation in which the loose filler particles are completely moisturised with binding agent, i.e. when a coating of the binding agent envelopes the loose particles, as it were.

Since the droplets of binding agent used in the present invention cure more rapidly, the risk of the incompletely cured and bonded filler falling out of said at least one cavity of the moulded product is significantly reduced and can even be reduced to a minimum. This enables a more rapid production of building materials, whilst the binding agent has sufficiently cured at the end of the production line to form a stable building material with sufficient structural integrity.

The present method makes it possible to fill larger cavities or even channels in a moulded product without the risk of the filler insufficiently bonding and curing, which is not sufficiently possible with the method according to the prior art.

According to a preferred embodiment, the size of the droplets of binding agent ranges between 1 μm and 25 μm, since the present inventors have found that such a size provides good bonding properties and curing properties.

The size of the droplets of binding agent in particular ranges between 1 μm and 10 μm, more in particular between 1 μm and 5 μm, because such a range provides optimum bonding and curing properties. The size of the droplets will be explained in more detail in the examples.

The droplets of binding agent can be obtained in any desired manner, for example by atomising or spraying.

In another preferred embodiment, said at least one cavity in the moulded product extends the entire height of the moulded product, that is from top to bottom. In other words, at least one channel is present in the moulded product.

Moulded products provided with cavities of this type can be filled with loose filler particles by means of the present invention. The obtained building materials according to the present invention have satisfactory properties as regards bonding, insulation and stability.

The moulded product may have any desired shape and dimensions. The height of the moulded product is understood to be the dimension parallel to the longitudinal direction of said at least one cavity. If said at least one cavity extends the entire height of the moulded product, thus forming channels, the length of the cavity will be the same as the height of the moulded product. The height of the moulded product may preferably range between 10 and 50 cm, in particular between 20 and 40 cm, more in particular between 25 and 35 cm, for example 30 cm. The length and the width of the moulded product may vary between, for example, 5 and 50 cm, in particular between 15 and 40 cm. Examples of dimensions of the cavities are shown hereinafter in Example 1. It will be understood, however, that other dimensions are also possible.

An example of a moulded product is an assembly of (wooden) columns and/or walls in interior and exterior walls of existing buildings or buildings under construction. The cavity is in that case defined by the space between the columns and/or walls.

In a preferred embodiment, said at least one cavity in the moulded products has a cross-sectional area (that is, length by width, shown in $cm^2$) in the direction substantially perpendicular to the length of said at least one cavity of about 0.2 $cm^2$ to 300 $cm^2$, preferably 0.5 $cm^2$ to 100 $cm^2$.

An example of a moulded product is shown in FIG. 1. The dimensions of this moulded product are of 30 cm×25 cm×30 cm (l×w×h). The moulded product is provided with two large channels having dimensions of 5 cm×5 cm×30 cm (l×w×h) (a cross-sectional area of 25 $cm^2$) and a large number of small channels having dimensions of 0.3 cm×3 cm×30 cm (l×w×h) (a cross-sectional area of 0.9 $cm^2$).

Building materials according to the present invention can be made on the basis of moulded products provided with cavities having varying cross-sectional areas, for example varying between 0.2 $cm^2$ and 300 $cm^2$. The cross-sectional shape of the cavity is not specifically limited, it may for example be rectangular, square, triangular, round or polygonal. A moulded product may comprise cavities of one or more different dimensions and one or more different shapes (see FIG. 1, for example).

The filler used in the present invention is preferably selected from the group consisting of mineral wool, cellulose fibres and a combination thereof. Other possibilities are dried grass, sheep's wool, chicken feathers, but also granulates such as polystyrene foam granulate (expanded polystyrene or EPS), expanded glass granulate and the like. Such filler materials can be readily processed into loose particles, in particular fibres, and are therefore preferred. Said filler materials also exhibit good heat and sound insulation properties.

In particular mineral wool, for example glass wool or rock wool, is preferred for use as a filler, because of its availability, processability, bonding properties and heat and sound insulation properties. The length and the diameter of the filler can be suitably selected from the available range by a person skilled in the art in dependence on the desired application and the dimension of the cavities in the moulded products.

The dimension of the loose filler particles is not specifically limited. It is preferable, however, to use loose particles having a length ranging between, for example, 2 mm and 5 cm, preferably between 5 mm and 1 cm, and a diameter from 0.001 to 0.5 mm, preferably from 0.002 to 0.08 mm.

According to the present invention, the binding agent that is used is preferably a silicate. Binding agents of this kind can be readily processed into droplets and bond excellently to the fibres that are used. In addition to that, they exhibit a good adhesion between the filler and the moulded product.

In principle other types of binding agent may be used as well, as long as it is possible to apply said binding agents in the form of small droplets. The preferred binding agent is an inorganic and inflammable binding agent having a short drying time, of which silicate is the main component. In this way the obtained product will have a short drying time as well as advantageous fire resistance properties.

In a particularly preferred embodiment of the present invention, the binding agent is selected from the group consisting of sodium silicate, potassium silicate and a combination thereof. Said silicates exhibit a good solubility in solvents, such as water.

It is preferable to apply the binding agent to the filler in the form of an aqueous solution of the binding agent. In this way it becomes possible to form the binding agent into droplets. The binding agent is preferably present in the aqueous solution in an amount of 20-50 wt. %, as will be explained in more detail hereinafter.

It is preferred to add a surfactant to the binding agent as well if the binding agent is used in an (aqueous) solution. Such a surfactant reduces the surface tension of the solvent, such as water, which makes it easier to atomise the binding agent into small droplets.

An aqueous solution of a silicate that does not contain a surfactant cannot be easily atomised into the small droplets which, according to the present invention, must be used. When a silicate not containing a surfactant is atomised, small droplets of binding agent solution are formed, to be true, but said droplets will merge into larger drops in the mist that is formed, which is undesirable for the present invention.

The present inventors have observed that in order to obtain a good surface-active effect, it is preferable to use the surfactant in an amount of 0.2-5 wt. % of the amount of binding agent. The surfactant that is used is not specifically limited, and a person skilled in this field of the art will be able to determine which surfactant can be used best in combination with a specific binding agent and for a specific application. Preferably, a surfactant is used which does not combust and which remains active in an environment with a pH of 11 to 13. An example of such a surfactant is Teepol from Shell.

The amount of binding agent that is used preferably ranges between 2 and 30 wt. %, in particular between 4 and 15 wt. %, more in particular between 5 and 8 wt. % of the amount of filler.

The present inventors have carried out research, which has shown that such an amount of binding agent provides good results as regards bonding properties, curing time and insulation properties. If the binding agent is used in an amount of less than 2 wt. %, the bond will be less strong, and if the binding agent is used in an amount of more than 30 wt. %, the insulation properties will deteriorate. Good results are obtained in particular when the binding agent is used in an amount of 5-8 wt. %.

It is also possible to apply an activator to the filler, which activator activates the binding agent. Such an activator can shorten the curing time of the binding agent. The activator may already be applied during the production of the filler, or while the loose filler particles are being formed. In addition to that it is possible to apply the activator to the loose filler particles after the binding agent has been applied to the loose filler particles.

The type of activator depends on the type of binding agent that is used. If a silicate is used as the binding agent, it is preferable to use an acid as the activator. Silicate exhibits gelling as soon as that pH of the solution is decreased to a value of less than pH 8. Polycarbonate forms an acid as soon as it is contacted with silicate and consequently it is very suitable for use as an activator. Other possibilities for use as an activator are tartaric acid, silicic acid and citric acid.

The shape and the dimension of the hollow spaces does not directly influence the effect of the present invention. In principle the present invention can be implemented at any location where there are hollow spaces and where thermal, acoustic or fire resistance properties are needed. If discrete moulded products in the form of blocks as shown in FIG. 1 are used, the building materials according to the present invention are preferably produced in a factory and subsequently transported to the building site. If an assembly of columns and/or walls is used, filling with filler material will take place at the building site itself. This latter embodiment is an improvement on the current insulation methods, which use PUR foam or glass fibre mats, because of the ease of handling as well as the optimum thermal, acoustic and fire resistance properties.

The activator is preferably used in an amount of 0.5-15 wt. % of the amount of binding agent. Research carried out by the present inventors has shown that such an amount of activator provides an optimum activation effect without unduly diluting the binding agent. The type of activator to be used is not specifically limited and will depend on the binding agent that is used. A person skilled in the art will be able to select a suitable activator.

Preferably, the number of droplets of binding agent per loose filler particle is at least 5, more preferably at least 10 and in particular at least 25.

Such a number of droplets ensures a correct formation of an adhesive network with the loose filler particles. In this way a strong adhesion of the loose filler particles to each other is obtained. Said droplets of binding agent also provide the adhesion between the filler and the moulded product, so that the filler will be firmly anchored in the moulded product after curing. If fewer than, for example, 5 droplets are present, the bond will be insufficient. If the number of droplets per loose filler particle is much higher than 50, there is a possibility that said droplets will merge and thus form a film or a coating on the surface of the loose particle, which film will have a longer curing time, which is undesirable. The number of droplets that is preferred will partially depend on the size of the loose filler particles.

Preferably, a ceramic material is used as the basic material, because of the good mechanical and thermal properties thereof. Examples are the ceramic building blocks marketed by Unipor, Munich, Germany. Other materials and moulded products, such as hollow concrete blocks, cellular concrete and sand-lime brick may also be used, however. Moulded products are preferably commercially available building blocks for exterior and interior walls whose thermal and acoustic properties are relevant. Other possibilities are ceramic chimney elements, roller shutter casings and the like. Also non-ceramic moulded products, such as the hollow spaces between "metal stud" or (wooden) columns or walls, can be formed by using the present invention. Such moulded products are preferably filled with the filler according to the present invention at the building site once they are correctly positioned. This is also referred to as insulation.

The binding agent that is used preferably has a curing time of less than 10 minutes, in particular less than 5 minutes, more in particular less than 3 minutes. Such a curing time ensures that curing of the binding agent takes place during the process of filling and curing of the binding agent before the building material leaves the process line, thereby preventing any risk of loss of filler material from the building material. The present building materials based on discrete moulded products exhibit an excellent filler retention and are easy to transport, store and handle, therefore, without any loss of insulation value and the related loss of constructional value.

The present invention also relates to a method according to the preamble, which is characterised in that the binding agent is applied to the loose particles in the form of droplets having a size ranging between about 1 μm and 50 μm.

The aforesaid embodiments relating to the building material also apply as far as the present method is concerned and are defined in more detail in the claims. This embodiments and the advantages thereof will not be explained in more detail again and reference is made to the description thereof.

The concentration of the binding agent in the solution, such as water or another suitable solvent, for example, preferably ranges between 20 and 50 wt. %. If the concentration is higher than 50 wt. %, it will be less easy to atomise the binder solution in the form of small droplets, since the viscosity will become too high. If the concentration is lower than 20 wt. %, the curing time will be longer, since a larger amount of solvent, such as water, for example, needs to be evaporated, which is disadvantageous for the present method.

It is preferable to carry out the step of providing the loose particles by means of a carder or carding machine, in which the filler is fiberised so as to form the loose particles. An example of a carder or carding machine is shown in the aforesaid Dutch patent No. 1005149.

The fiberisation of the filler so as to form the loose filler particles is preferably carried out in two fiberisation steps, which steps are carried out in succession on the carding machine, using a separate set of brushes, for example. The advantage of this is that loose particles having a more defined size and shape can thus be obtained.

The binding agent is preferably applied to the loose filler particles between the first fiberisation step and the second fiberisation step, in particular directly before the second fiberisation step is carried out.

If the binding agent is applied to the loose particles during an earlier stage of the carding process, for example before or just after the first fiberisation step, there is a possibility that the binding agent will already have cured in large measure at the moment it is introduced into said at least one cavity, which has an adverse effect on the filling process and also on the bond of the filler to the moulded product.

If the filler is only provided after the second fiberisation step, i.e. directly before the filler is introduced into said at least one cavity, the filler will be distributed less homogeneously over the loose filler particles, which may have a negative effect on the eventual strength of the material.

In a preferred method, the binding agent is heated during the curing process, which is thus accelerated. Said heating of the binding agent may for example be carried out when the binding agent is already present in the moulded product, for example by means of infrared radiation. The advantage of this is that the binding agent will cure in particular while it is present in the moulded product so as to obtain an excellent bond to the moulded product.

It is also possible, however, to carry out said heating during the second fiberisation step, for example by using the heat that is automatically generated by the various brushes of the carding machine that are used in the second fiberisation step, i.e. before the binding agent is present in the moulded product. In this way the filler will consist of loose particles, which are introduced into the moulded product together with the heated binding agent, after which further curing of the filler will directly take place. In this way no additional heating means are needed.

The present invention further relates to the spraying of an insulation material consisting of the present filler between an assembly of (wooden) columns or walls, which columns and/or walls may be considered as being the moulded product according to the present invention. A hollow space is present between said columns and/or walls. Said walls are interior and exterior walls which are open on one side prior to the execution of the present method. The filler according to the present invention is preferably transported to a nozzle via a hose, using air, near the inlet of which nozzle one or more spray nozzles are present, which apply the binding agent to the filler, preferably in the form of a fine mist of a silicate. In this way a cohesion is obtained between the loose filler particles and also between the columns, with the total humidity level of the filler and the binding agent preferably ranging between 8 and 25%, in particular between 15 and 17%. When the filling of said hollow spaces is complete, an interior cladding may be directly fixed to the columns. This embodiment of the present method relates to the insulation of walls. The moulded product is an assembly of columns in this case, preferably wooden columns and/or walls, which have been provided as part of a wall in a building, which assembly is open on one side. The exact configuration of the above-described assembly is known to those skilled in the field of building materials and will not be explained in more detail herein, therefore. It is for example possible to fill the hollow spaces between two brick walls, the so-called cavity, with the filler according to the present invention, in which case the walls together form the moulded product, therefore, and the cavity may be regarded as the hollow space in the moulded product according to the present invention. In this way an excellent insulation can be obtained.

The present invention further relates to the use of a building material according to the present invention or to a building material obtained by using a method according to the present invention for building structures having improved thermal and/or acoustic and/or fire resistance properties.

The present invention will be explained in more detail by means of the following example.

EXAMPLE

The moulded product that is used is a moulded product comparable to the moulded product shown in FIG. 1. The moulded product that is used is a ceramic building block, such as the building block marketed by Unipor, Munich, Germany. The dimensions used in the present example are as follows. The length ranges between 25 and 37 cm, the width is 25 cm and the height is 25 cm. The cavities in the moulded products are rectangular to triangular in shape, with a height of 25 cm, a length varying between 3 and 15 cm and a width varying between 0.3 and 3 cm. Sodium silicate in an amount of 25 wt. % in an aqueous solution is used as the binding agent. Rock wool is used as the filler, the loose particles of which are fibres having a length of 15 mm and a diameter of 0.2 mm.

A carding machine is used for fiberising blocks of rock wool. Said fiberisation is carried out in two steps. Directly before the second fiberisation step, the binder solution is atomised and applied to the fibres so as to form droplets thereon. Directly after the second fiberisation step, the loose filler particles are introduced into the cavities of the moulded product. Then curing of the whole takes place for a period of about 5 minutes. The number of droplets per fibre may be assessed under a microscope (for example an electron microscope or a light microscope). Also the size of the droplets may be assessed. The size of the droplets depends on the setting of the atomising device by which the atomisation is carried out. A number of tests have been carried out, during which the size of the droplets was adjusted. The results as far as the adhesion of the loose particles to each other and of the loose particles to the moulded product as well as the curing time are shown in the table, in which a longer curing time is assessed as negative. The results are shown in the table below for an amount of drops of about 20 per fibre.

TABLE

| droplet size (μm) | adhesion | curing time |
|---|---|---|
| 100 | + | − − |
| 50 | + | ○ |
| 25 | + | +/○ |
| 10 | + | + |
| 5 | + | + + |
| 2 | + | + + |

From the table above it appears that it is preferable to select the size of the droplets so that the droplets will be smaller than 50 μm, in particular 25 μm or smaller, in particular 10 μm or smaller, more in particular 5 μm or smaller in connection with the curing time.

Further embodiments are defined in the appended claims.

What is claimed is:

1. A building material consisting of a moulded product of a base material, which moulded product is provided with at least one cavity, which cavity is filled with a filler in the form of loose particles, which loose particles have been bonded together by means of a binding agent, characterised in that said binding agent is present on the loose filler particles in the form of droplets having a size ranging between about 1 μm and about 50 μm.

2. The building material according to claim 1, wherein the size of the droplets of binding agent ranges between 1 μm and 25 μm.

3. The building material according to claim 2, wherein the size of the droplets of binding agent ranges between 1 μm and 10 μm.

4. The building material according to claim 3 where the size of the droplets of binding agent ranges between 1 μm and 5 μm.

5. The building material according to claim 1, wherein said at least one cavity in the moulded product extends the entire height of the moulded product.

6. The building material according to claim 1, wherein said at least one cavity in the moulded products has a cross-sectional area in a direction substantially perpendicular to the length of said at least one cavity of about 0.2 $cm^2$ to 300 $cm^2$.

7. The building material according to claim 6, wherein said at least one cavity in the moulded products has a cross-sectional area in a direction substantially perpendicular to the length of said at least one cavity of about 0.5 $cm^2$ to 100 $cm^2$.

8. The building material according to claim 1, wherein the filler has been selected from the group consisting of mineral wool, cellulose fibres, dried grass, sheep's wool, chicken feathers, expanded polystyrene granulate, and expanded glass granulate, and a combination thereof.

9. The building material according to claim 1, characterised in that said binding agent is a silicate.

10. The building material according to claim 9, wherein the binding agent has been selected from the group consisting of sodium silicate, potassium silicate, and a combination thereof.

11. The building material according to claim 1, wherein a surfactant is furthermore present in the droplets of the binding agent.

12. The building material according to claim 11, wherein the surfactant is present in an amount of 0.2-5 wt. % of the amount of binding agent.

13. The building material according to claim 1, characterised in that the amount of binding agent that is used ranges between 2 and 30 wt. % of the amount of filler.

14. The building material according to claim 13, characterised in that the amount of binding agent that is used ranges between 4 and 15 wt. % of the amount of filler.

15. The building material according to claim 14, characterised in that the amount of binding agent that is used ranges between 5 and 8 wt. % of the amount of filler.

16. The building material according to claim 1, wherein an activator is furthermore present on the filler, which the activator activates the binding agent.

17. The building material according to claim 16, wherein the amount of activator is 0.5-15 wt. % of the amount of binding agent.

18. The building material according to claim 1, wherein the number of droplets of the binding agent per loose filler particle is at least 5.

19. The building material according to claim 18, wherein the number of droplets of the binding agent per loose filler particle is at least 10.

20. The building material according to claim 19, wherein the number of droplets of the binding agent per loose filler particle is at least 25.

21. The building material according to claim 1, wherein the basic material is a ceramic material.

22. The building material according to claim 1, wherein the binding agent has a curing time of maximally 10 minutes, after the application thereof to the loose filler particles.

23. The building material according to claim 22, wherein the binding agent has a curing time of maximally 5 minutes after the application thereof to the loose filler particles.

24. The building material according to claim 23, wherein the binding agent has a curing time of maximally 3 minutes after the application thereof to the loose filler particles.

25. A method for manufacturing a building material, which method comprises the steps of:

providing a moulded product of a base material, which moulded product is provided with at least one cavity;

providing a filler in the form of loose particles;

applying a binding agent to the loose filler particles;

introducing the loose filler particles into said at least one cavity of the moulded product; and curing the binding agent so as to obtain a building material in which the loose filler particles are bound together by the binding agent, characterised in that the binding agent is applied to the loose particles in the form of droplets having a size ranging between about 1 μm and 50 μm.

26. The method according to claim 25, wherein the binding agent is applied in the form of droplets having a size ranging between 1 μm and 25 μm.

27. The method according to claim 26, wherein the binding agent is applied in the form of droplets having a size ranging between 1 μm and 10 μm.

28. The method according to claim 27, wherein the binding agent is applied in the form of droplets having a size ranging between 1 μm and 5 μm.

29. The method according to claim 25, wherein said at least one cavity in the moulded product extends the entire height of the moulded product.

30. The method according to claim 25, wherein said at least one cavity has a cross-sectional area in a direction substantially perpendicular to the length of said at least one cavity of about 0.2 $cm^2$ to 300 $cm^2$.

31. The method according to claim 30, wherein said at least one cavity has a cross-sectional area in a direction substantially perpendicular to the length of said at least one cavity of about 0.5 $cm^2$ to 100 $cm^2$.

32. The method according to claim 25, wherein the filler is selected from the group consisting of mineral wool, cellulose fibres, and a combination thereof.

33. The method according to claim 25, wherein a silicate, is used as the binding agent.

34. The method according to claim 25, wherein the binding agent is selected from the group consisting of sodium silicate, potassium silicate, and a combination thereof.

35. The method according to claim 25, wherein the binding agent is used in the form of an aqueous solution of the binding agent.

36. The method according to claim 35, wherein the concentration of said binding agent in the aqueous solution ranges between 20 and 50 wt. %.

37. The method according to claim 35, characterised in that said aqueous solution of the binding agent comprises a surfactant.

38. The method according to claim 37, wherein the surfactant is present in the aqueous solution of the binding agent in an amount of 0.2-5 wt. % of the amount of binding agent.

39. The method according to claim 25, characterised in that the binding agent is applied to the loose filler particles in an amount of 2-30 wt. % of the amount of filler.

40. The method according to claim 39, characterised in that the binding agent is applied to the loose filler particles in an amount of 5-8 wt. % of the amount of filler.

41. The method according to claim 25, characterised in that the method also comprises a step of applying an activator to the filler, which activator activates the binding agent.

42. The method according to claim 41, characterised in that the activator is applied to the filler before the binding agent is applied to the filler.

43. The method according to claim 41, characterised in that the activator is applied to the filler in an amount of 0.5-15 wt. % of the amount of binding agent.

44. The method according to claim 25, wherein at least 5 droplets of binding agent are applied per loose filler particle.

45. The method according to claim 44, wherein at least 10 droplets of binding agent are applied per loose filler particle.

46. The method according to claim 45, wherein at least 25 droplets of binding agent are applied per loose filler particle.

47. The method according to claim 25, wherein the curing of the binding agent is carried out for maximally 10 minutes.

48. The method according to claim 47, wherein the curing of the binding agent is carried out for maximally 5 minutes.

49. The method according to claim 48 wherein the curing of the binding agent is carried out for maximally 3 minutes.

50. The method according to claim 25, wherein a carding machine is used for carrying out the step of providing the loose filler particles, in which the carding machine, the filler is fiberised so as to form loose filler particles.

51. The method according to claim 50, wherein said fiberisation of the filler so as to form loose filler particles is carried out in two fiberisation steps.

52. The method according to claim 51, wherein the binding agent is applied to the loose particles of the filler between the first fiberisation step and the second fiberisation step is carried out.

53. The method according to claim 52, wherein the binding agent is applied to the loose particles of the filler before the second fiberisation step is carried out.

54. The method according to claim 25, wherein the binding agent is heated during the step of curing the binding agent.

55. The method according to claim 54, wherein the binding agent is heated while being present in said at least one cavity of the moulded product.

56. The method according claim 25, wherein the binding agent is heated during the second fiberisation step, before the loose filler particles are introduced into said at least one cavity of the moulded product.

57. The method according to claim 54, wherein the binding agent is heated by means of infrared radiation.

58. The method according to claim 25, wherein an assembly of columns arranged as part of a wall in a building is used as the moulded product, which the assembly of columns is open on one side.

* * * * *